UNITED STATES PATENT OFFICE.

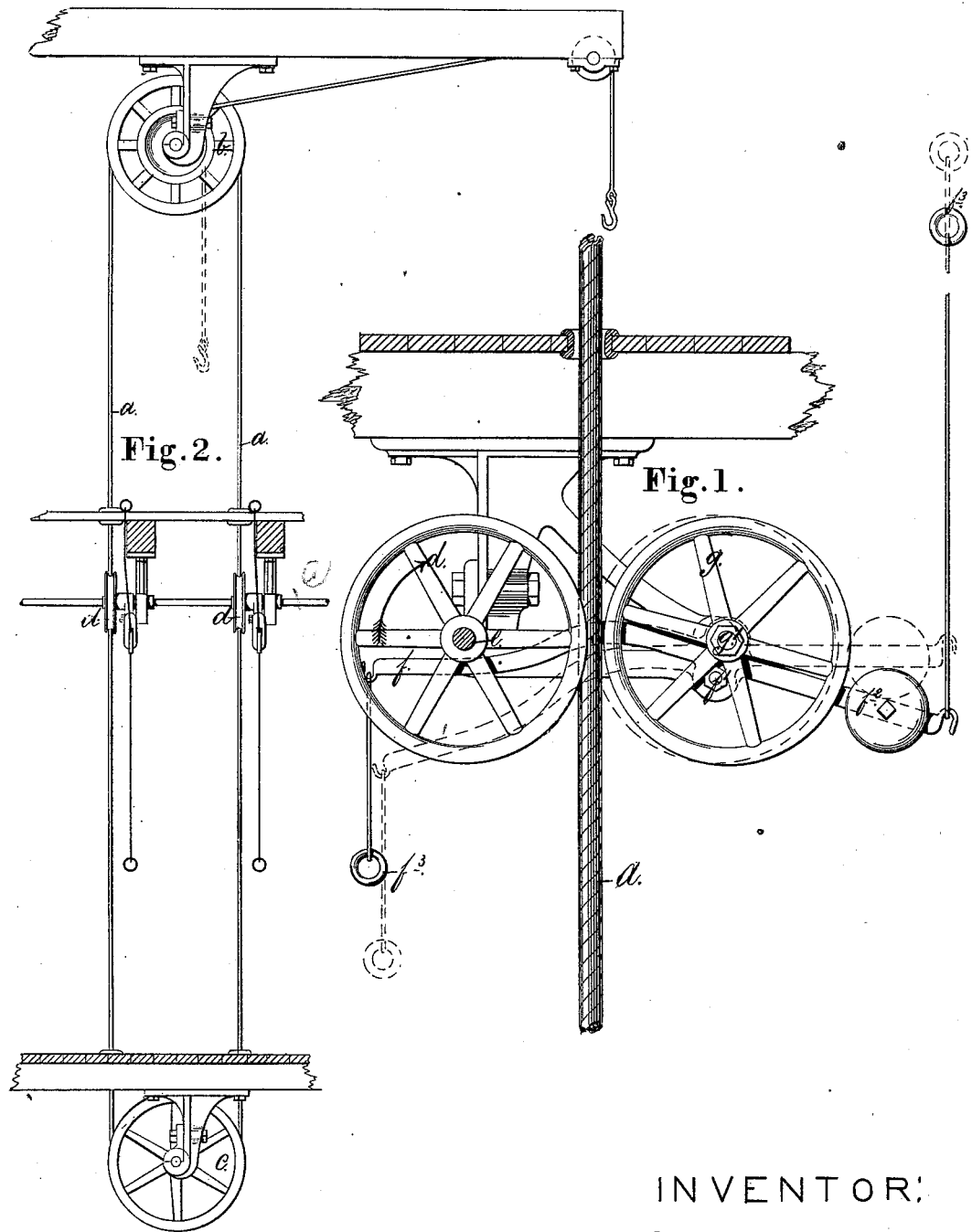

PHILIP SYKES, OF PROVIDENCE, RHODE ISLAND.

IMPROVEMENT IN ELEVATORS.

Specification forming part of Letters Patent No. 206,052, dated July 16, 1878; application filed June 7, 1878.

*To all whom it may concern:*

Be it known that I, PHILIP SYKES, of the city and county of Providence, and State of Rhode Island, have invented certain new and useful Improvements in Power-Hoists; and I hereby declare that the following is a full, clear, and exact description of the same, reference being had to the accompanying drawings, forming part of this specification.

Figure 1 is a view of my improved power-hoists applied to an endless rope. It is shown in the position occupied when disconnected from the rope in solid lines, and when connected in broken lines. Fig. 2 is a view, showing the application of my power-hoist to the ordinary endless-rope hoist used in warehouses, so that either side of the rope may be operated, and thereby the hoist run in either direction, and goods may be hoisted by power.

In the drawings, $a$ represents an endless rope extending over the scored pulley $b$, by which the rope or hoisting barrel is driven at the lower end. The endless rope may be passed over a scored pulley, $c$; or a loop may be formed without the pulley $c$ by passing the rope through and beneath the floor.

$d$ is a grooved pulley, secured to a shaft, $e$, driven by power, and placed so that the rope $a$ will hang in the groove of the pulley $d$, and close to the same.

$f$ is a hinged lever, secured at the fulcrum $f^1$. The lever is provided with an arm, on which, close to and above the fulcrum $f^2$, a stud or pin, $g'$, carries the grooved pulley $g$, so that the depression of the lever $f$ at its forward end brings the grooved pulley $g$ against the rope $a$ and firmly in contact with the driving-pulley $d$, thereby imparting motion to the rope $a$. The lever $f$ and grooved pulley $g$ are counterbalanced by the adjustable weight $f^2$, and ropes or wires are connected with both ends of the lever $f$, extending upward and downward to $f^3$, so that the driving-pulley $d$ can be connected with or disconnected from the rope $a$.

To apply steam or other motive power to the ordinary rope-hoist, one of the machines shown in Fig. 1 is placed on each side and connected with each line of the endless rope $a$, as shown in Fig. 2; and as the driving-pulleys $d$ both turn in the same direction, as indicated by the arrow in Fig. 1, the hoist may be operated to run in either direction by connecting either one or the other of the driving-pulleys to the endless rope. When the driving-pulley is connected with the side of the endless rope so as to lower a weight, the other apparatus may be used as a brake on the opposite side of the rope; or a weight may be lowered by drawing the pressure-pulley sufficiently against the rope to cause friction.

The power attachment is simple and strong, can be secured to any existing hoist, and does not interfere with its use as a hand-hoist when the power is not available; and the pressure and friction on the rope can be so regulated that a heavy weight may be held suspended at a given height, and rapidly lowered when required, for when the friction on the rope is but just sufficient to maintain or balance the weight the same will be held suspended, and when the opposite driving-pulley is brought in contact with the rope the weight will be lowered.

Having thus described my invention, I claim as new and desire to secure by Letters Patent—

1. The combination, with the rope $a$, of the revolving grooved pulley $d$, the counterbalanced lever $f$, and loose pulley $g$, the whole arranged to operate substantially as and for the purpose set forth.

2. The combination, with the hand-hoist provided with an endless rope, of two grooved driving-pulleys and two pressure-pulleys, arranged to drive the hoist in either direction, substantially as and for the purpose set forth.

PHILIP SYKES.

Witnesses:
JOSEPH A. MILLER,
JOSEPH A. MILLER, Jr.